(12) United States Patent
Chitre et al.

(10) Patent No.: US 8,145,417 B1
(45) Date of Patent: Mar. 27, 2012

(54) ENABLING A FIRST MOBILE DEVICE TO NAVIGATE TO A LOCATION ASSOCIATED WITH A SECOND MOBILE DEVICE

(75) Inventors: Monica Chitre, Watchung, NJ (US); Deepa Sukumaran, Basking Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 516 days.

(21) Appl. No.: 12/318,576

(22) Filed: Dec. 31, 2008

(51) Int. Cl.
*G01C 21/00* (2006.01)

(52) U.S. Cl. ............ 701/201; 455/16; 455/62; 455/455; 455/450; 455/513; 375/211; 375/219; 370/280; 370/342; 264/328.3; 264/328.5; 323/283; 307/31; 380/34; 385/132

(58) Field of Classification Search .................. 701/201; 455/16, 62, 445, 450, 513, 517, 522, 551, 455/509; 375/211, 219, E1.032; 370/31, 370/280, 342; 264/328.3, 328.5; 323/283; 307/31; 380/34; 385/132
See application file for complete search history.

(56) References Cited

U.S. PATENT DOCUMENTS

| | | | |
|---|---|---|---|
| 6,169,497 B1 * | 1/2001 | Robert | ............ 340/988 |
| 6,243,039 B1 | 6/2001 | Elliot | |
| 6,801,850 B1 | 10/2004 | Wolfson | |
| 6,867,733 B2 * | 3/2005 | Sandhu et al. | ........... 342/357.34 |
| 7,099,921 B1 | 8/2006 | Engstrom et al. | |
| 7,373,153 B2 | 5/2008 | Daurensan | |
| 7,598,855 B2 * | 10/2009 | Scalisi et al. | ............. 340/539.13 |
| 2006/0270421 A1 | 11/2006 | Phillips et al. | |
| 2007/0244633 A1 | 10/2007 | Phillips et al. | |
| 2009/0143079 A1 * | 6/2009 | Klassen et al. | ............. 455/456.3 |

FOREIGN PATENT DOCUMENTS

| | | |
|---|---|---|
| WO | WO 2007/115221 A2 | 10/2007 |
| WO | WO 2008/083273 A2 | 7/2008 |

OTHER PUBLICATIONS http://www.location.netin/magazine/2008/july-august/24_1.htm, downloaded May 4, 2009.
Wilson, A., et al., "BlueTable: Connecting Wireless Mobile Devices on Interactive Surfaces Using Vision-Based Handshaking" download from http://research.microsoft.com/~awilson/papers/GI%202007. pdf on May 4, 2009.
http://www.researchandmarkets.com/reports/301200/mobile_location_based_services_information, downloaded May 4, 2009.
http://corporate.maptuit.com/, downloaded May 4, 2009.
http://corporate.maptuitcom/about/releases/20080807.php, downloaded May 4, 2009.
Rainio, A., et al., "Location-Based Services and Personal Navigation in Mobile Information Society", downloaded from http://www.fig. net/pub/proceedings/korea/full-papers/pdf/plenary1/rainio.pdf on May 4, 2009.

(Continued)

*Primary Examiner* — James Trammell
*Assistant Examiner* — McDieunel Marc

(57) ABSTRACT

A method is described that allows a first mobile device to persistently lock onto a second mobile device, thereby allowing the first mobile device to not only constantly monitor the dynamic location of the second mobile device but also to adaptively navigate in real-time to the dynamic location associated with the second mobile device. The dynamic location may include a current location of the second mobile device or a final destination for travel of the second mobile device.

31 Claims, 6 Drawing Sheets

OTHER PUBLICATIONS

"Geographic information—Location based services tracking and navigation", Draft International Standard ISO/DIS 19133, International Organization for Standardization, 2004, downloaded from http://www.bakosurtanal.go.id/upl_document/konsesus07nop2006/Standar_Internasional/ISO_DIS_19133.pdf on May 4, 2009.

"Whitepaper—Navigating the Wireless Opportunity", Portable Navigation & Wireless Tracking Western European Markets & Forecasts 2007-2012, downloaded from http://www.c2mweb.eu/files/CLIVE/White_Paper_Tracking_and_Navigation_secure.pdf on May 4, 2009.

http://products.vzw.com/index.aspx?id=fnd_toolsApps_childFinder, downloaded Dec. 1, 2008.

http://www.uberphones.com/2006/06/lg/chaperon_child_locator_service_by_verizon_wireless/, downloaded Dec. 1, 2008.

"Alltel Wireless Introduces Axcess Family Finder", Business Services Industry Business Wire, Nov. 14, 2007, downloaded from http://findarticles.com/p/articles/mi_mOEIN/is_/ai_n27445307 on May 4, 2009.

http://www.mobiletracker.net/archives/2006/11/14/boost-mobile-loopt, downloaded May 4, 2009.

http://www.apple.com/webapps/socialnetworking/buddybeacon.html, downloaded Nov. 21, 2008.

http://desinformado.spaces.live.com/Blog/cns!ED2438301EF519AB!1956.entry, downloaded Nov. 21, 2008.

http://searchtelecom.techtarget.com/sDefinition/0,,sid103_gci1265084,00.html, downloaded on Dec. 2, 2008.

http://www.phonescoop.com/glossary/term.php?gid=223, downloaded on Dec. 2, 2008.

http://www.boostmobile.com/boostloopt/, downloaded May 4, 2009.

* cited by examiner

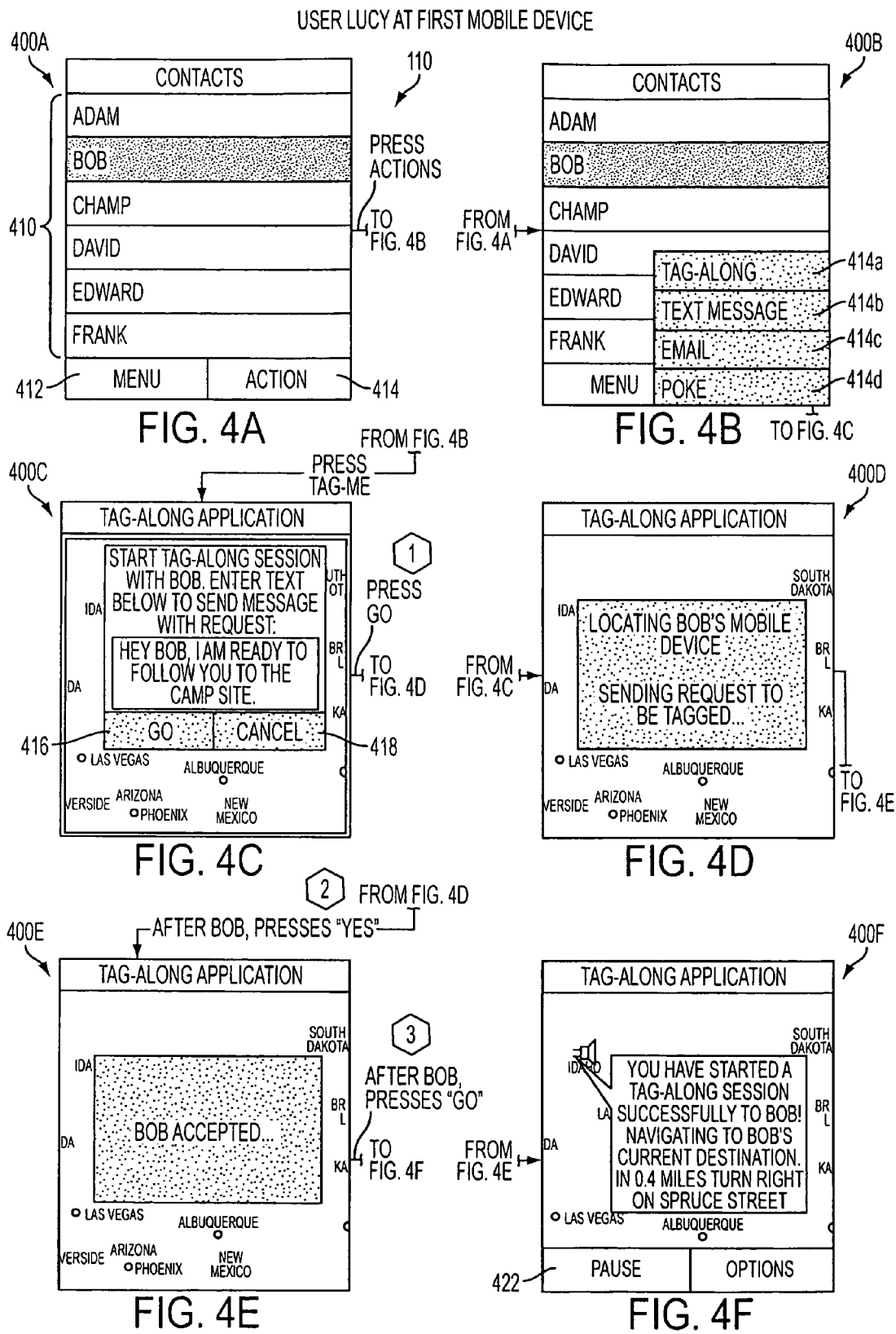

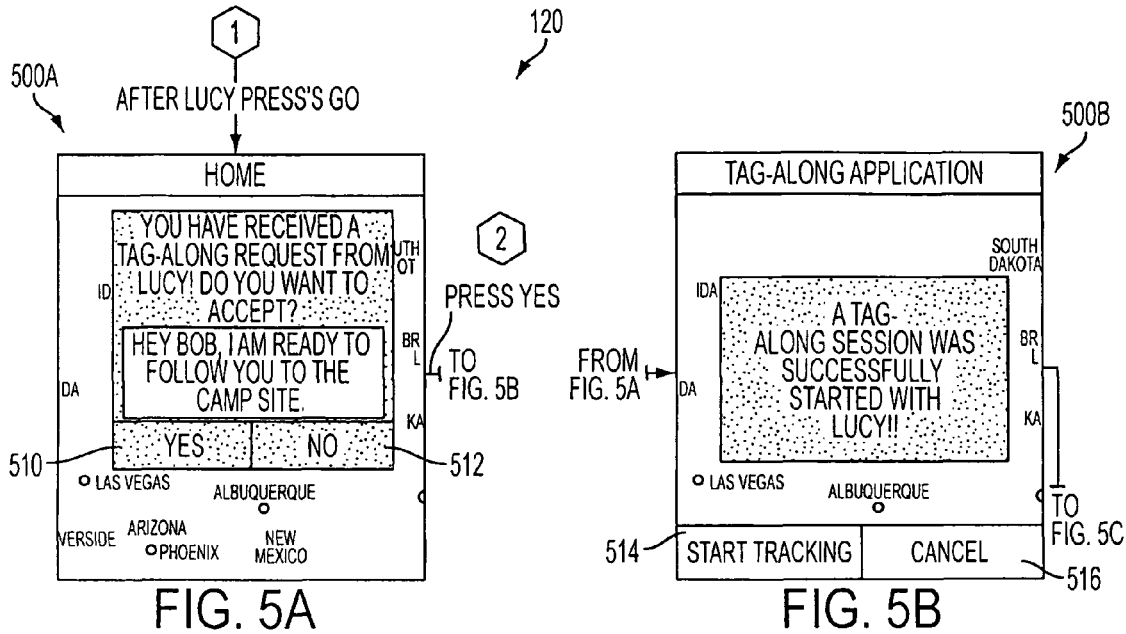
FIG. 5A / FIG. 5B
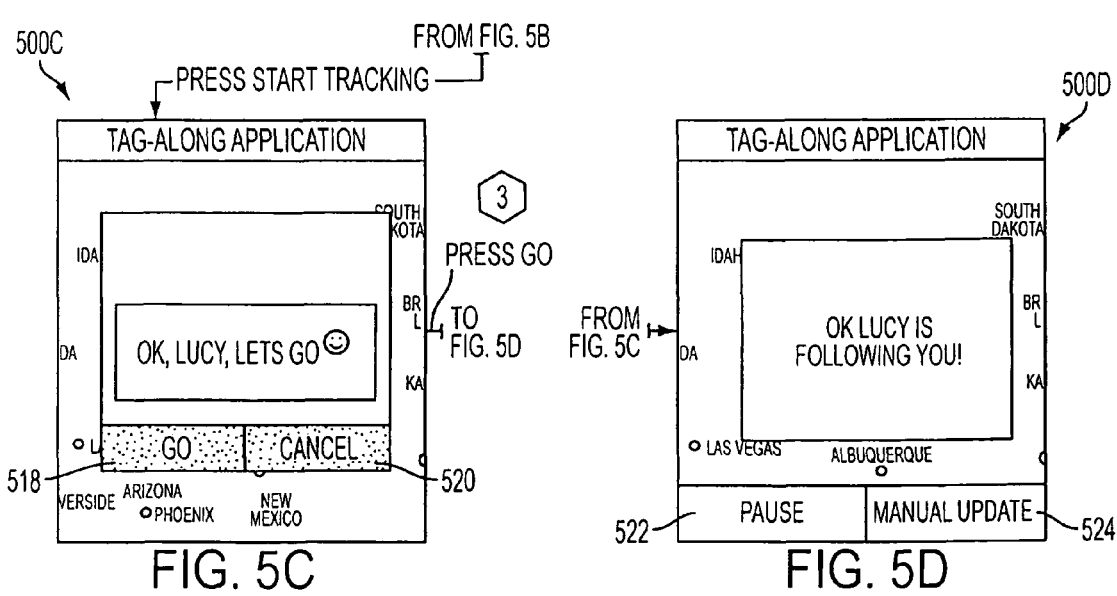
FIG. 5C / FIG. 5D

ENABLING A FIRST MOBILE DEVICE TO NAVIGATE TO A LOCATION ASSOCIATED WITH A SECOND MOBILE DEVICE

TECHNICAL FIELD

This disclosure relates to a method for enabling a first mobile device to navigate to a location associated with a second mobile device.

BACKGROUND

Mobile network service providers today offer a wide range of Mobile Location-Based Services ("MLBS") in the market place that enable a user of a first mobile device to locate a user of a second mobile device, based on the location of the second mobile device. Such MLBS may include, for example, Chaperone offered by Verizon Wireless®, Axcess Family Finder offered by Alltel Wireless®, and Boost Loop offered by BoostMobile™. Chaperon is a simple and secure method for parents to keep a closer tab on their children. It allows a customer (e.g., a parent) to view on a map a location of the Chaperone enabled phone of another customer (e.g., a child) and to receive alerts when the Chaperone enabled phone enters or leaves a particular zone.

Similar to Chaperone technology, Axcess Family Finder allows a parent to determine the location of an Axcess Family Finder-capable phone associated with a child. To illustrate, using a personal computer or a mobile phone, the parent may access an Axcess Family Finder Web site to view on a map specific areas that its child has frequently visited (e.g., movie theaters and parks) and to perform on-demand search to locate an Axcess Family Finder-capable phone of the child. Chaperone and Axcess Family Finder were mainly designed to keep tabs on the family members.

Boost Loop, however, expanded the idea of keeping tabs on family members to keeping tabs on friends. In this connection, Boost Loop is another location-based social service that uses a mobile phone built-in GPS to automatically update a customer location for a private list of friends. To illustrate, the customer downloads the Boost Loop software onto its mobile phone and publishes its location on a Boost Loop map. Thereafter, the customer may invite other friends who have installed Boost Loop to join the customer's networks. If friends accept such invitation, their locations will also be published on the map. As such, the customer can identify the locations of its friends in real-time on a map display on the customer's mobile device.

Although the aforementioned technologies allow a requesting device to monitor the current location of the target device, they do not allow the requesting device to seamlessly navigate to the current location of the target device. That is, should the requesting device wish to navigate to the current location of the target device, the requesting device has to copy the current location of the target device, input this static location to a navigator application, and then navigate to this static location. These steps have to be repeated each time the target device changes location.

Therefore, there is a need for a system that takes the concept of periodic location alerts a step further to allow a requesting device to persistently lock onto the target device's dynamic location, thereby allowing the requesting device to not only constantly monitor the dynamic location of the target device but also to adaptively navigate in real-time to the dynamic location associated with the target device. The dynamic location may include a current location of the target device or the final destination for travel of the target device.

SUMMARY

According to one general aspect, a method is disclosed for enabling a first mobile device to navigate to a final destination for travel of a second mobile device. The method includes steps of identifying, at a first mobile device, a second mobile device; selecting, at the first mobile device, to navigate to a final destination for travel of the second mobile device; and sending, in response to the selecting step, a navigate request over a mobile network to the second mobile device, requesting identification of the final destination for travel of the second mobile device. The method also includes steps of receiving over the mobile network, in response to the navigate request, a response from the second mobile device, accepting the navigate request and providing information identifying the final destination for travel of the second mobile device. The method also includes identifying the current location of the first mobile device; calculating directions from the current location of the first mobile device to the final destination for travel of the second mobile device; and displaying the directions on the first mobile device.

Implementations of the above general aspect may include one or more of the following features. For example, identifying the second mobile device may include identifying a user of the second mobile device. Identifying the second mobile device may include identifying the second mobile device from among a plurality of mobile devices associated with the user of the second mobile device. Sending the navigate request to the second mobile device may include sending an invitation data call session over the mobile network to the second mobile device; and receiving the response from the second mobile device may include receiving an acknowledgment from the second mobile device accepting the invitation and providing information identifying the final destination for travel of the second mobile device. Displaying the directions on the first mobile device may include displaying turn-by-turn directions on the first mobile device. The directions may include a route.

The method may further include steps of receiving, at the first mobile device, a real-time update associated with the final destination for travel of the second mobile device; determining, at the first mobile device, whether the final destination for travel of the second mobile device has changed based on the received real-time update; and calculating, at the first mobile device, directions from the current location of the first mobile device to the updated final destination for travel of the second mobile device upon determining that the final destination for travel of the second mobile device has changed.

Alternatively or additionally, the method may include the steps of receiving, at the first mobile device, a real-time update associated with the final destination for travel of the second mobile device when the final destination for travel of the second mobile device changes and calculating, at the first mobile device, directions from the current location of the first mobile device to the changed final destination for travel of the second mobile device. Calculating directions from the current location of the first mobile device to the changed final destination for travel of the second mobile device may include calculating a revised route from the current location of the first mobile device to the changed location of the second mobile device.

In another general aspect, a method is disclosed for a enabling a user of a first mobile device to navigate to a location of a user of a second mobile device. The method includes steps of identifying, at a first mobile device, a user and a second mobile device associated with the user; selecting, at the first mobile device, to navigate to the location of the second mobile device; and sending, in response to the selecting step, a navigate request over a mobile network to the second mobile device, requesting to navigate to the location of the second mobile device. The method also includes steps of receiving via the mobile network, in response to the navigate request, a response from the second mobile device, accepting the navigate request and providing information identifying a current location of the second mobile device. The method also includes identifying the current location of the first mobile device; calculating directions from the current location of the first mobile device to the current location of the second mobile device; and displaying the directions on the first mobile device.

Implementations of the above general aspect may include one or more of the following features. For example, identifying the user may include identifying a user from a contact list of the user of the first mobile device. Identifying the second mobile device may include identifying the second mobile device from among a plurality of mobile devices associated with the identified user. Sending the navigate request to the second mobile device may include sending a "tag-along" invitation data call session over the mobile network to the second mobile device and receiving the response from the second mobile device may include receiving an acknowledgment from the second mobile device accepting the "tag-along" invitation and providing information identifying current location of the second mobile device.

The method may further include the steps of locking, at the first mobile device, onto current location of second mobile device and monitoring, at the first mobile device, the current location of the second mobile device, for example, as the user of the second mobile station moves from one location to another. In such scenario, calculating directions may include calculating, on the first mobile device, directions to the current location of the second mobile device and displaying the directions may include displaying, on the first mobile device, the directions to the current location of the second mobile device. Displaying the directions on the first mobile device may include displaying turn-by-turn directions on the first mobile device. The directions may include a route.

The method may further include the steps of receiving, at the first mobile device, a real-time update associated with the location of the second mobile device; determining, at the first mobile device, whether the location of the second mobile device has changed based on the received real-time update; and calculating, at the first mobile device, directions from the current location of the first mobile device to the updated location of the second mobile device upon determining that the location of the second mobile device has changed.

Alternatively or additionally, the method may further include the steps of receiving, at the first mobile device, a real-time update associated with the location of the second mobile device when the location of the second mobile device changes and calculating, at the first mobile device, directions from the current location of the first mobile device to the changed location of the second mobile device. Calculating directions from the current location of the first mobile device to the changed location of the second mobile device may include calculating a revised route from the current location of the first mobile device to the changed location of the second mobile device.

In another general aspect, a method is disclosed for enabling a user of a first mobile device to navigate to a dynamic location associated with a second mobile device. The method includes steps of identifying, at a first mobile device, a user and a second mobile device associated with the user and selecting, at the first mobile device, to navigate in real-time to a dynamic location associated with the second mobile device. The method also includes a step of sending, in response to the selecting step, a navigate request over a mobile network to the second mobile device, requesting to navigate in real-time to the dynamic location associated with the second mobile device.

Additionally, the method includes a step of receiving via the mobile network, in response to the navigate request, a response from the second mobile device, accepting the navigate request and providing information identifying the dynamic location associated with the second mobile device. The method also includes steps of identifying the current location of the first mobile device; calculating directions from the current location of the first mobile device to the dynamic location associated with the second mobile device; updating calculated directions as the dynamic location associated with the second mobile device changes; and displaying the directions on the first mobile device.

Implementations of the above general aspect may include one or more of the following features. Identifying the user may include identifying a user from a contact list of the user of the first mobile device. Sending the navigate request to the second mobile device may include sending a "tag-along" navigate request to the second mobile device, requesting to navigate in real-time to the current location of the second mobile device and receiving the response from the second mobile device may include receiving an acknowledgment from the second mobile device accepting the "tag-along" navigate request and providing information identifying current location of the second mobile device. Alternatively, sending the navigate request to the second mobile device may include sending a "tag-along" navigate request to the second mobile device, requesting to navigate in real-time to a final destination for travel of the second mobile device and receiving the response from the second mobile device may include receiving an acknowledgment from the second mobile device accepting the "tag-along" navigate request and providing information identifying the final destination for travel of the second mobile device.

Updating the calculated directions may include identifying that the dynamic location associated with the second mobile device has changed and updating the calculated directions based on the changed dynamic location associated with the second mobile device. Displaying the directions on the first mobile device may include displaying turn-by-turn directions on the first mobile device.

In still another general aspect, a method is disclosed for enabling a first mobile device to request that a second mobile device to navigate to a location associated with the first mobile device. The method includes a step of receiving, at a second mobile device and over a mobile network, a navigate request from a first mobile device, requesting that the second mobile device to navigate to a dynamic location associated with the first mobile device. The request includes information identifying the dynamic location associated with the first mobile device to the second mobile device. The method also includes steps of sending to the first mobile device a response accepting the navigate request; identifying a current location of the second mobile device; and calculating directions from the current location of the second mobile device to the dynamic location associated with the first mobile device. Additionally, the method includes a step of displaying the directions on the first mobile device.

Implementations of the above general aspect may include one or more of the following features. The dynamic location of the first mobile device may include a current location of the first mobile device. Alternatively or additionally, the dynamic location of the first mobile device may include a final destination of travel for the first mobile device. Displaying directions may include displaying turn-by-turn directions. The method may further include a step of updating the calculated directions as the dynamic location of the first mobile device changes.

Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF DRAWINGS

FIGS. 4A-4F illustrate exemplary user interface displays that may appear on the first mobile device during the process illustrated by FIG. 2.

FIGS. 5A-5D illustrate exemplary user interface displays that may appear on the second mobile device during the process illustrated by FIG. 2.

DETAILED DESCRIPTION

Figure 1:
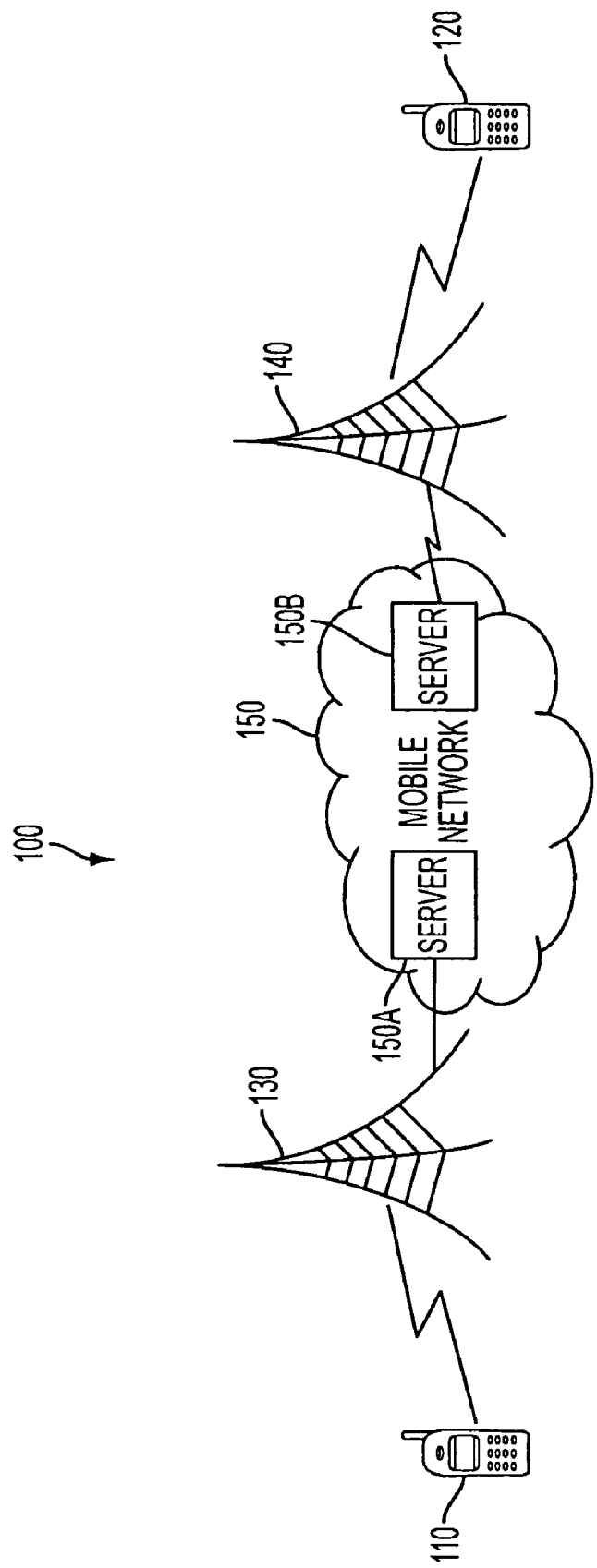
FIG. 1 illustrates a system for enabling a user of a first mobile device to navigate to a location associated with a user of a second mobile device.

In the following detailed description, numerous specific details are set forth by way of examples in order to provide a thorough understanding of the relevant teachings. However, present teachings may be practiced without such details. In other instances, well-known methods, procedures, components, and circuitry have been described at a relatively high-level, without detail, in order to avoid unnecessarily obscuring aspects of the present teachings.

This disclosure describes methods that allow a first mobile device to persistently lock onto a second mobile device, thereby allowing the first mobile device to not only constantly monitor the dynamic location of the second mobile device but also to adaptively navigate in real-time to the dynamic location associated with the second mobile device. The dynamic location may include a current location of the second mobile device or a final destination for travel of the second mobile device. In the examples, real-time changes in the current location or final destination of the second mobile device will cause automatic updates to navigation directions of the first mobile device.

To provide context, in one implementation, the first mobile device requests from the second mobile device to establish a special tag-along data call session therewith. Upon approval of such tag-along data call session, the second mobile device allows the first mobile device to lock onto the second mobile device in a couple of ways. First, the second mobile device may allow the first mobile device to lock onto the current location of the second mobile device and navigate in real-time to such device location dynamically as the second mobile device moves about. Alternatively, the second mobile device may allow the first mobile device to lock onto the final destination or route of the second mobile device and navigate in real-time to such final destination or route. The lock with the second mobile device enables the first mobile device to get turn-by-turn directions that automatically adapt to any changes in the second mobile device's current location, final destination, or route.

Accordingly, the user of the first mobile device can be sure that it will not miss the point of interest regardless of the change in current location or the final destination for travel of the second mobile device. Therefore, the user of the first mobile device can concentrate on other activities such as, for example, driving or talking to friends.

In a slightly different implementation, this disclosure also describes methods that allow a first mobile device to request that a second mobile device persistently lock onto the first mobile device, thereby allowing the second mobile device not only constantly monitor the dynamic location associated with the first mobile device but also to adaptively navigate in real-time to the dynamic location associated the first mobile device. The dynamic location may include a current location of the first mobile device or a final destination for travel of the first mobile device. In the examples, real-time changes in the current location or final destination of the first mobile device will cause automatic updates to navigation directions of the second mobile device.

The foregoing technology can have powerful applications for people in many situations. To illustrate one example, assume a father is driving from work and is planning to meet family at a restaurant, but he does not know the name and the location of the restaurant. By locking onto the family's mobile device, the father's mobile phone can retrieve the final destination of the family's mobile device, and navigate to that final destination. The father needs not call to find the new destination, note it down, and enter it into his GPS device to navigate to the restaurant. All he needs to do is to lock onto the family's mobile device.

To illustrate another example, instead of navigating directly to the final destination, assume now that the father wishes to follow the family to the final destination. In such a scenario, the father's mobile phone instead of requesting the final destination of the family's mobile device will request for information identifying the current location of the family's mobile device and navigate in real-time to that current location. This way the father can be sure not to miss his family no matter how many changes happen in route.

Reference is now made in detail to the examples illustrated in the accompanying drawings and discussed below. FIG. 1 illustrates a system 100 for enabling a user of a first mobile device to navigate to a location associated with a user of a second mobile device. The system 100 includes a first mobile device 110 and a second mobile device 120 communicating with each other through base stations 130, 140 and a mobile network 150. In one implementation, the mobile devices 110, 120 include software that enable them to act as a mobile phone. To this end, the mobile devices 110, 120 are each configured to receive as an input a telephone number associated with a call recipient and in response send, over the mobile network 150, a request to connect to a mobile device associated with the entered telephone number.

Such mobile devices 110, 120 may be, for example, a wireless telephone, a 'smart' mobile phone (e.g., with a touch screen), a personal digital assistant ("PDA"), a messaging device (e.g., a pager), a text messaging or a portable e-mail device (e.g., a Blackberry® or a Sidekick®), a portable music player (e.g., an iPod®) or some other electronic portable messaging, entertainment, organization, or gaming device. Regardless of the particular type, the mobile devices 110, 120 each includes an interface for receiving, from the user, an input such as, for example, a number associated with another mobile device.

The mobile devices 110, 120 are configured to provide information identifying their current locations. To do so, in one implementation, the mobile devices 110, 120 are equipped for Global Positioning System ("GPS") operation. The GPS is used to track location of a mobile device by using signals from GPS satellites orbiting the earth. To enhance performance beyond that of the GPS receiver in the stand-alone mode, the system 100 may utilize Assisted GPS. To this end, the system 100 may include a Position Determining Entity ("PDE"), which communicates with each of the mobile devices 110, 120 having a GPS receiver to determine the current location of the respective mobile devices 110, 120. In an asserted GPS implementation, the PDE provides the mobile devices 110, 120 with information regarding satellites which is in clear view of the mobile device and sends strong satellite signals enough at that location to reliably demodulate ephemeris data. As such, the Assisted GPS can prevent the mobile devices 110, 120 from spending precious time on obtaining the satellite almanac data from invisible satellites that send weak signals to the particular location. In some implementations, the PDE may also process measurements that a mobile device takes from the satellite signal to compute the final location fix for the mobile device, rather than requiring the mobile device to perform the complex computations internally.

The base stations 130, 140 may serve as a hub for radio communications over the mobile network 150 and may support sub-layers of an air-link protocol carried for transmitting and/or receiving data packets to and/or from the mobile devices 110, 120. The base stations 130, 140 could be using one of several mobile access technologies for allowing the mobile device to connect to the mobile network 150. For example, the base stations 130, 140 may be using access technologies such as global system for mobile communications ("GSM"), general packet radio service ("GPRS"), code division multiple access ("CDMA"), ultra mobile broadband ("UMB"), long term evolution ("LTE"), and/or WiMax. The base stations 130, 140, however, are not limited to these technologies.

Regardless of the type of technology used by the base stations 130, 140, base stations 130, 140 are configured to allow the first mobile device 110 to communicate with the second mobile device 120 through the mobile network 150. To this end, the base stations 130, 140 respectively interface with the mobile network 150 via servers 150A, 150B. The mobile network 150 may include IP Multimedia Subsystem ("IMS"). IMS is a general-purpose, open standard for voice and multimedia communications over packet-based IP networks. It enables person-to-person communications in a variety of modes—including voice, text, pictures or combination thereof—in a highly personalized way. Older network architectures may use other network routing technologies for packet or circuit switched connectivity.

Moving forward, a user of the first mobile device 110 may wish to navigate to a location associated with the second mobile device 120 or alternatively may wish to have the second mobile device 120 to navigate to a location associated with the first mobile device 110. In either case, the first mobile device 110 establishes a navigation session with the second mobile device 120 through the mobile network 150. The navigation session may include a tag-along session or a tag-me session. The tag-along session allows the first mobile device 110 to lock onto the current published location of the second mobile device 120 or the final destination for travel of the second mobile device 120. The lock with the second mobile device 120 enables the first mobile device 110 to get turn-by-turn directions to the current location or the final destination for travel of the second mobile device 120 (as the case may be) and to automatically adapt to changes in the current location or the final destination. This process is described in more detail with respect to FIG. 2.

The tag-me session allows the first mobile device 110 to have the second mobile device 120 to lock onto the current published location of the first mobile device 110 or the final destination for travel of the first mobile device 110. The lock with the first mobile device 110 enables the second mobile device 110 to get turn-by-turn directions to the current location or the final destination for travel of the first mobile device 110 (as the case may be) and to automatically adapt to changes in the current location or the final destination. This process is described in more detail with respect to FIG. 6.

Figure 2:
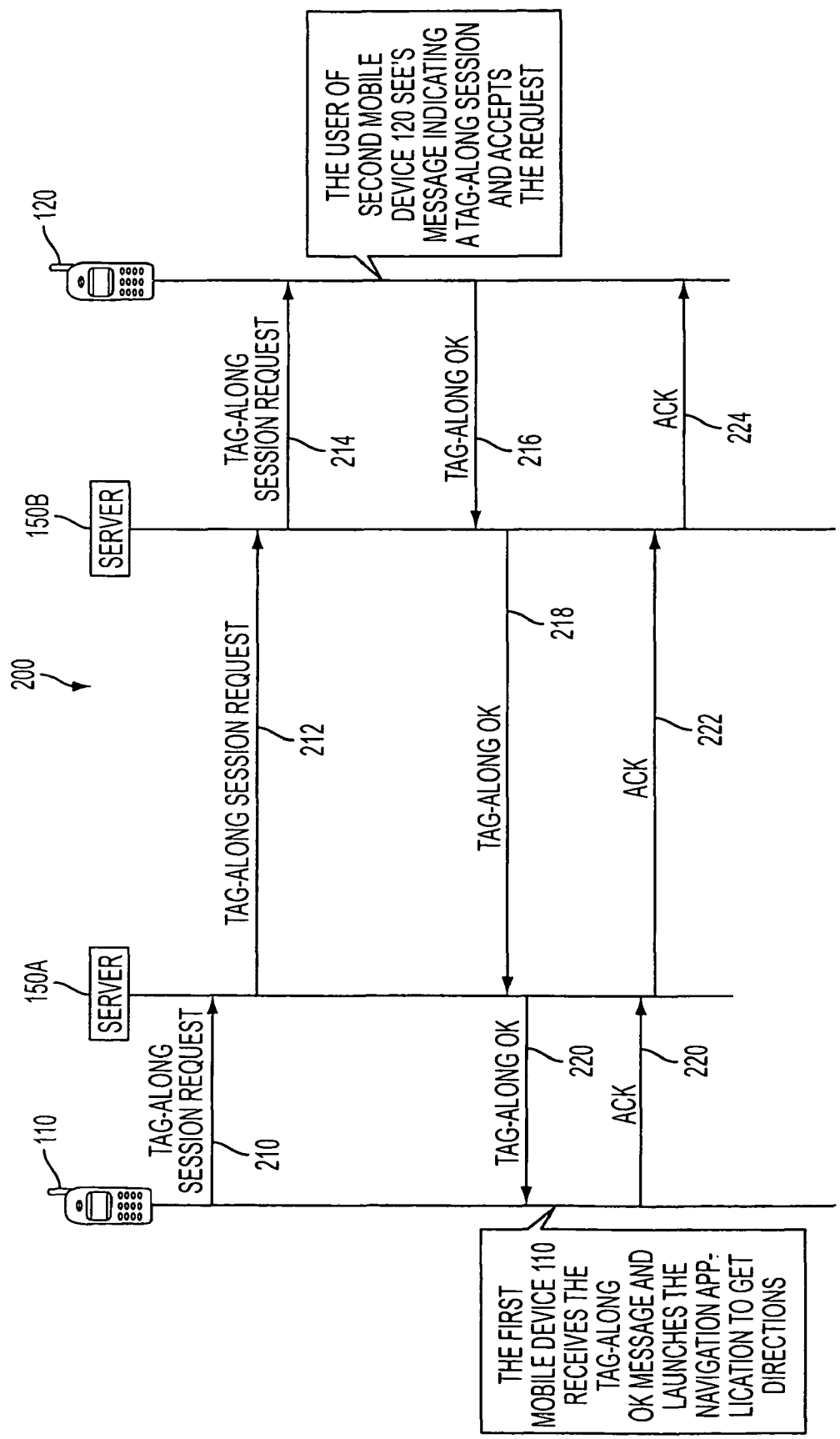
FIG. 2 illustrates an exemplary process for establishing a tag-along session between the first mobile device and the second mobile device via a system such as that illustrated by FIG. 1.

FIG. 2 illustrates an exemplary process 200 for establishing a tag-along session between the first mobile device 110 and the second mobile device 120. In keeping with the previous examples and for convenience, particular components described with respect to FIG. 1 are referenced as performing the exemplary process 200. More particularly, the process 200 involves the first mobile device 110, the second mobile device 120, and servers 150A, 150B associated with the mobile network 150. Therefore, these components are not described in more detail.

Process 200 beings with the first mobile device 110 sending a tag-along session request to the server 150A (step 210). The tag-along session request may include a request for navigating to the current location of the second mobile device 120. Alternatively, the tag-along session request may include a request for navigating to the final destination for travel of the second mobile device 120. The user of the first mobile device 110 has the opportunity to define the tag-along request. To do so, in one implementation, the user of the first mobile device 110 selects another user from among contacts stored in a contact list and identifies a mobile device (e.g., the second mobile device 120) associated with the selected user. Thereafter, the user selects whether it wishes to navigate to the current location of the second mobile device 120 or to the final destination for travel of the second mobile device 120.

In either case and in response to such a selection, the first mobile device 110 forwards the tag-along session request to the server 150A (step 210). The server 150A receives the tag-along session request and forwards the same to server 150B (step 212), which in turn forwards it to the second mobile device 120 (step 214). The second mobile device 120 receives the tag-along session request and displays it to its user. The user has the option of accepting or rejecting the tag-along session request. If the user rejects the tag-along session request, the session is closed and a response indicating the same is forwarded back to the first mobile device 110 (not shown). Alternatively, if the user accepts the tag-along session request, the session is established and a response indicating the same is forwarded back to the first mobile device 110 (steps 216, 218, and 220).

Depending on the type of the tag-along session request, the response may include information identifying a current location of the second mobile device 120 or the final destination of the second mobile device 120. To illustrate further, in a scenario in which the user requests to navigate in real-time to the current location of the second mobile device 120, the response includes information identifying a current location of the second mobile device 120. However, in a scenario in which the user requests to navigate to the final destination for travel of the second mobile device 120, the response includes information identifying the final destination for travel of the second mobile device 120.

The first mobile device 110 receives the response and sends an acknowledgement back to the second mobile device 120 (steps 220, 222, and 224). Additionally, the first mobile device 110 launches the navigation application to get directions to the location identified in the response. To this end, the navigation application identifies the current location of the first mobile device 110 and calculates directions from the current location of the first mobile device 110 to either the current location or the final destination (as the case may be) of the second mobile device 120. Thereafter, the first mobile device 110 displays the directions to the user. The directions may include turn-by-turn navigation directions. Alternatively or additionally, the directions may include a route to the identified point of interest.

In the scenario in which the tag-along session request includes a request for navigating to the current location of the second mobile device 120, the second mobile device 120 provides tag-along updates to the first mobile device 110. The tag-along updates may be performed automatically or manually. In the automatic mode, the tag along updates may be provided based on certain time frequency. In such scenario, the tag-along updates are periodically provided to the first mobile device 110 regardless of the actual change in the location of the second mobile device 120. The first mobile device 110 receives the updates and determines whether the location of the second mobile device 120 has changed. If so, the first mobile device 110 calculates directions from the current location of the first mobile device 110 to the updated location of the second mobile device 120.

Figure 3:
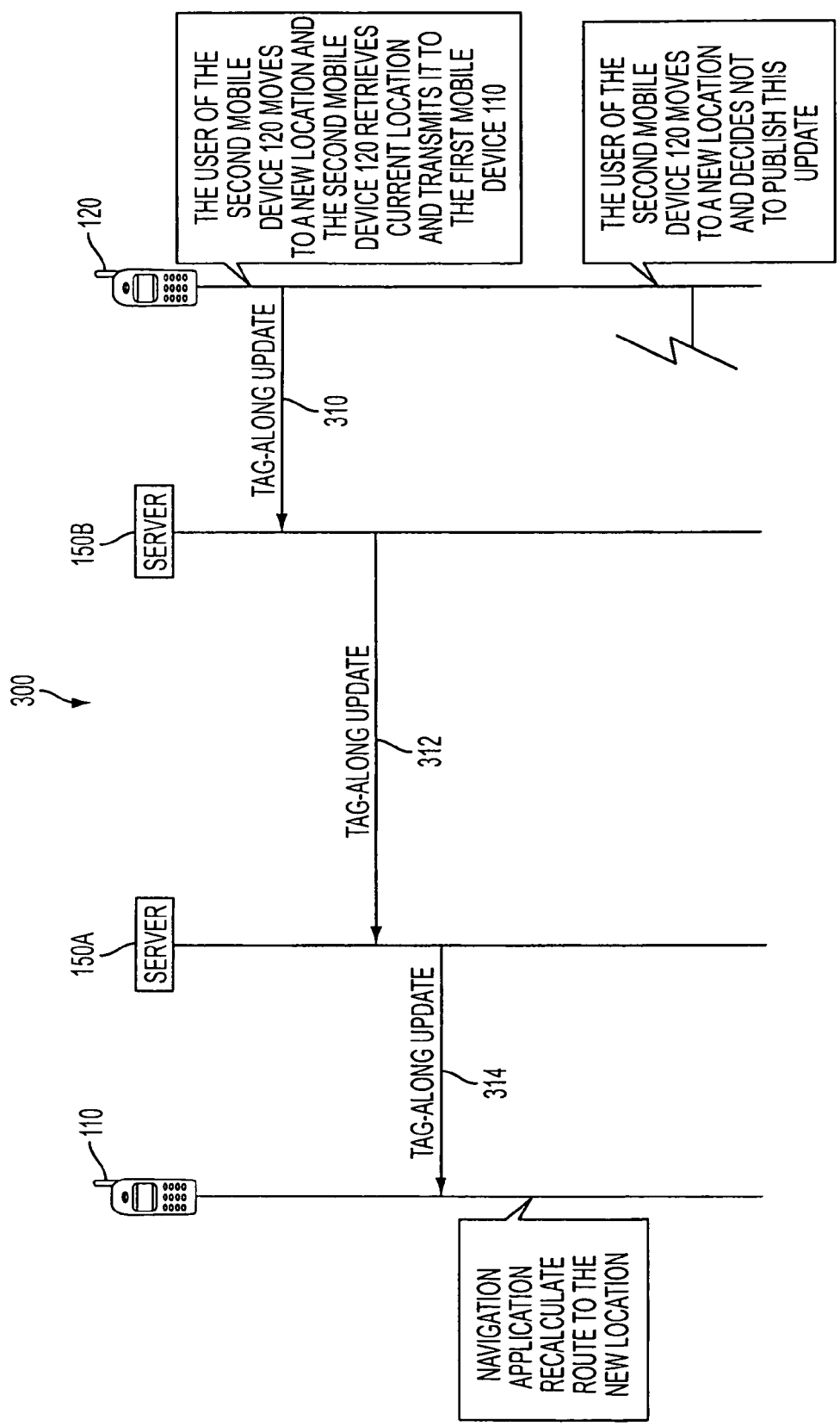
FIG. 3 illustrates an exemplary process for providing tag-along updates to the first mobile device as the location of the second mobile device via a system such as that illustrated by FIG. 1 changes.

In another implementation, the automatic update is triggered based on the actual change in location of the second mobile device 120. That is, the tag-along updates are automatically provided to the first mobile device 110 when the location of the second mobile device 120 actually changes. FIG. 3 illustrates an exemplary process 300 describing such a scenario. As shown, when the user of the second mobile device 120 moves to a new location, the second mobile device 120 retrieves current location of the second mobile device 120 and automatically transmits it to the server 150B as a part of tag-along update (step 310). The server 150B receives the tag-along update and forwards it to the server 150A, which in turn forwards it to the first mobile device 110 (steps 312, 314). Upon receiving the tag-along update, the mobile device 110 launches the navigation application and calculates directions to the updated location from the current location of the first mobile device 110.

It is possible that the user of the second mobile device 120 may move to a new location and wish not to publish this location to the first mobile device 110 to maintain privacy, for example. As such, in the automatic option, the user may be provided with an option to pause the automatic mode at user's discretion and later resume it when deemed appropriate.

FIGS. 4A-4F illustrate exemplary user interface displays that may appear on the first mobile device 110 during the process 200. FIGS. 5A-5D illustrate exemplary user interface displays that may appear on the second mobile device 120 during the process 200. FIG. 4A illustrates an exemplary contact list 400A of the user (hereinafter "Lucy") of the first mobile device 110. The contact list 400A includes a plurality of contacts 410, a menu icon 412, and an action icon 414. The plurality of contacts 410 includes contact information for Adam, Bob, Champ, David, Edward, and Frank. The menu icon 412 defines a plurality of services such as, for example, media gallery, alarm, camera, etc. The action icon 414 defines a plurality of actions such as, for example, a tag action 414*a*, a text messaging action 414*b*, an e-mail action 414*c*, and a poke action 414*d* as shown in FIG. 4B.

Moving forward, Lucy identifies Bob (e.g., a user of the second mobile device 120) among her contacts in the contact list 400A and then selects the action icon 414. Consequently, the user interface display 400A is replaced with the user interface display 400B. In the user interface display 400B, the plurality of actions embedded in the action icon 414 are expanded and displayed to Lucy. From among the displayed actions, Lucy selects the tag action 414*a* to navigate to the location associated with Bob's mobile device. In this connection, Lucy may select to navigate to the current location of Bob's mobile device or the final destination for travel of Bob's mobile device. However, for the sake of simplicity, it is assumed that Lucy selects to navigate to the current location of Bob's mobile device.

Upon selecting to navigate to the current location of Bob's mobile device, the user interface display 400B is replaced with the user interface display 400C illustrated by FIG. 4C. The user interface display 400C illustrates an exemplary tag-along application display. The tag-along application display informs Lucy that a tag-along request to the dynamic location of Bob's mobile device has been selected and solicits Lucy to send a message to Bob regarding same. The message may include, for example, "Hey Bob. I am ready to follow you to the camp site." Lucy will then have the option to confirm the request and send the message to Bob's mobile device by selecting a Go icon 416 or to cancel the request by selecting the Cancel icon 418.

Upon selecting the Go icon 416, the tag-along request is forwarded to Bob (steps 210, 212, and 214 shown in FIG. 2) and a display on the first mobile device 110 is changed to reflect the same. Referring to FIG. 4D, for example, the user interface display 400D informs Lucy that Bob's mobile device is being located and a tag-along request is being sent to Bob's mobile device. Once Bob's mobile device receives the request, it displays it to Bob and solicits Bob to accept or reject the tag-along request.

FIG. 5A illustrate an exemplary user interface display 500A that may be displayed to Bob upon receiving the tag-along request. The user interface display 500A states that "You have received a tag-along request from Lucy! Do you want to accept?" The user interface display 500A includes a Yes icon 510 and a No icon 512. If Bob selects the No icon 512, the tag-along request will be denied and a message reflecting the same is forwarded to Bob. However, if Bob selects the Yes icon 510, the tag-along request is accepted and a display on Bob's mobile device changes to user interface display 500B illustrated by FIG. 5B. Simultaneously, a message may be forwarded to Lucy's mobile device indicating that Bob has accepted the tag-along request as shown by exemplary user interface display 400E illustrated by FIG. 4E.

The user interface display 500B informs Bob that the tag-along request was successfully started with Lucy. The display 500B includes a Start Tracking icon 514 and a Cancel icon 516. The cancel functionality may be used to cancel the tag-along session. The Start Tracking icon 514 allows Bob to define the actual time the tracking begins. Upon selecting the Start Tracking icon 514, the current location of Bob's mobile device is forwarded to Lucy's mobile device. As noted above, in one implementation, the current location of Bob's mobile device may be sent to Lucy's mobile device periodically regardless of whether there is an actual change in the location of Bob's mobile device. In another implementation, the current location of Bob's mobile device may be sent to Lucy's mobile device when there is an actual change in the location of Bob's mobile device.

In either case, after selecting the Start Tracking icon 514, the user interface display 500B is changed to the user interface display 500C illustrated by FIG. 5C. The user interface display 500C illustrates a message that will be displayed to Lucy and allows Bob to confirm or cancel the message. To this end, the display 500C includes a Go icon 518 and a Cancel icon 520. If Bob selects the Go icon 518, the message will be forwarded to Lucy. If, however, Bob selects the No icon 520 the message will not be forwarded to Lucy and the tag-along session will be terminated.

Upon selecting the Go icon 518, the user interface display 500C is replaced with user interface display 500D illustrated by FIG. 5D. The user interface display 500D informs Bob that Lucy is following him and provides Bob with the option to pause the tag-along session at any time by clicking a Pause icon 522. The Pause icon 522 enables Bob to pause the automatic tag-along update mode at his discretion and later resume if deemed appropriate. The user interface display 500D also includes a Manual Update icon 524. The Manual Update icon 524 may be used when, for example, Bob wants to manually send an update about his location to Lucy.

Upon selecting the Go icon 518, the user interface display 400E is replaced with user interface display 400F illustrated by FIG. 4F. The user interface display 400F informs Lucy that she has started the tag-along session successfully to Bob and provides Lucy with directions to the current location of Bob's mobile device. Similar to the user interface display 500D, the user interface display 400E also includes a Pause icon 422. The Pause icon 422 enables Lucy to pause the tag-along session and later resume it if deemed appropriate.

Other implementations are contemplated. For example, even though in process 200, the tag-along session request is initiated by the first mobile device 110, it should be noted that either party can initiate such session. Furthermore, instead of tag-along session a party may initiate a tag-me session request. The tag-me session request may include a navigate request to the current location of the requesting device. Alternatively or additionally, the tag-me session request may include a navigate request to the final destination for travel of the requesting device.

Figure 6:
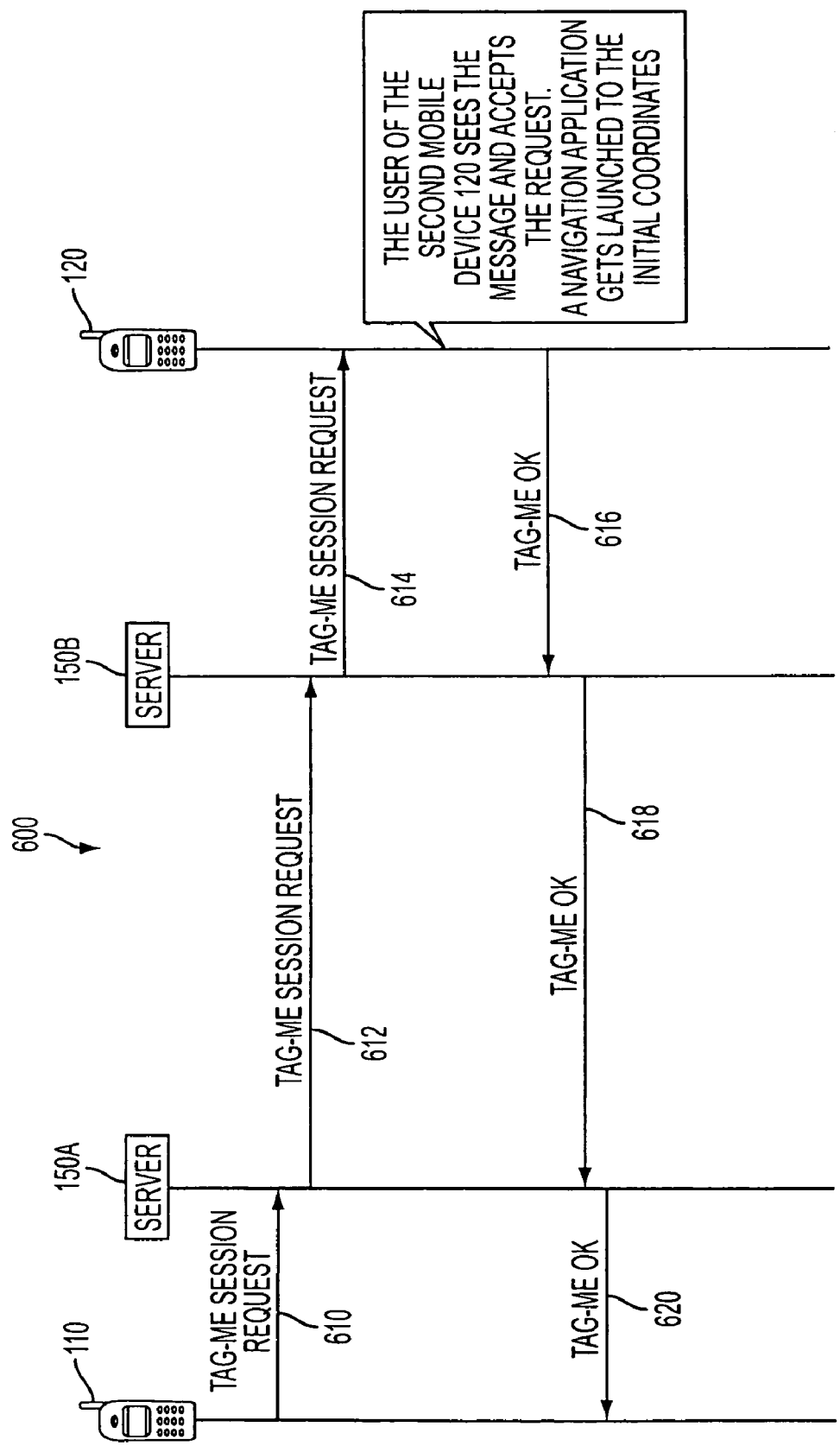
FIG. 6 illustrates an exemplary process for establishing a tag-me session between the first mobile device and the second mobile device via a system such as that illustrated by FIG. 1.

To illustrate further, FIG. 6 shows an exemplary process 600 for establishing a tag-me session between the first mobile device 110 and the second mobile device 120. In keeping with the previous examples and for convenience, particular components described with respect to FIG. 1 are referenced as performing the exemplary process 600. More particularly, the process 600 involves the first mobile device 110, the second mobile device 120, and servers 150A, 150B associated with the mobile network 150. Therefore, these components are not described in more detail.

Process 600 beings with the first mobile device 110 sending a tag-me session request to the server 150A (step 610). As noted above, the tag-me session request may include a navigate request to the current location of the first mobile device 110. Alternatively or additionally, the tag-me session request may include a navigate request to the final destination for travel of the first mobile device 110. The user of the first mobile device 110 has the opportunity to define the tag-me request. To do so, in one implementation, the user of the first mobile device 110 identifies another user from among contacts stored in a contact list and identifies a mobile device (e.g., the second mobile device 120) associated with the selected user. Thereafter, the user selects whether the identified user should navigate to the current location of the first mobile device 110 or to the final destination for travel of the first mobile device 110.

The first mobile device 110 forwards to server 150A the tag-me session request along with information identifying the current location of the first mobile device 110 or the final destination for travel of the first mobile device 110 (as the case may be) (step 610). The server 150A receives the tag-me session request and forwards the same to server 150B (step 612), which in turn forwards it to the second mobile device 120 (step 614). The second mobile device 120 receives the tag-me session request and displays it to its user. The user has the option of accepting or rejecting the tag-me session request. If the user rejects the tag-me session request, the session is closed and a response indicating the same is forwarded back to the first mobile device 110 (not shown). Alternatively, if the user accepts the tag-me session request, the session is established and a response indicating the same is forwarded back to the first mobile device 110 (steps 616, 618, and 620). In this connection, the second mobile device launches a navigation application and provides directions to the locations identified in the tag-me session request (e.g., the current location or the final destination for travel of the first mobile device). In this manner, the user of the second mobile device 120 navigate to the location associated with the first mobile device 110.

In yet another implementation, the methods may be modified to allow the users of several mobile devices to persistently lock onto the location associated with a particular mobile device, thereby allowing several mobile devices to not only monitor the dynamic location associated with the particular mobile device but also to adaptively navigate in real-time to the dynamic location associated with the particular mobile device. The dynamic location may include a current location of the particular mobile device or a final destination for travel of the particular mobile device.

Referring to FIG. 2, for example, instead of only one mobile device (e.g., the first mobile device 110) establishing tag-along session with the second mobile device 120, several mobile devices may establish a tag-along session with the second mobile device 120 and navigate in real-time to the dynamic location associated with the second mobile device 120 in manner similar to the exemplary process 200. The real-time changes in the dynamic location of the second mobile device 120 will cause automatic update to navigation directions of each of the several mobile devices depending on their respective current location.

To provide context, in one example, a group of friends may be bar-hopping to enjoy a night in town or to enjoy a popular festival or a parade. They can be sure not to lose each other by locking onto each other mobile devices on one-to-one or group-to-one tag-along sessions so that a group of friends could tag-along with ease to various destinations as they move from one spot to another. For example, one friend may be designated as a captain and the remaining friends may have their mobile devices lock onto the mobile device of the captain so that the remaining friends can easily follow the captain in the crowd. For another example, emergency service vehicles in high traffic metro areas can use the foregoing methods to follow each other in real-time to a common destination as the emergency situation might demand.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for enabling a first mobile device to navigate to a final destination of a second mobile device, the method comprising steps of:
identifying, at a first mobile device, a second mobile device;
selecting, at the first mobile device, to navigate to a final destination of the second mobile device;
sending, in response to the selecting step, a navigate request over a mobile network to the second mobile device, requesting identification of the final destination for travel of the second mobile device;
receiving over the mobile network, in response to the navigate request, a response from the second mobile device, accepting the navigate request and providing information identifying the final destination for travel of the second mobile device;
identifying the current location of the first mobile device;
calculating directions from the current location of the first mobile device to the final destination for travel of the second mobile device; and
displaying the directions on the first mobile device.

2. The method of claim 1, wherein identifying the second mobile device includes identifying a user of the second mobile device.

3. The method of claim 2, wherein identifying the second mobile device includes identifying the second mobile device from among a plurality of mobile devices associated with the user of the second mobile device.

4. The method of claim 1, wherein:
sending the navigate request to the second mobile device includes sending an invitation data call session over the mobile network to the second mobile device; and
receiving the response from the second mobile device includes receiving an acknowledgment from the second mobile device accepting the invitation and providing information identifying the final destination for travel of the second mobile device.

5. The method of claim 1, wherein displaying the directions on the first mobile device includes displaying turn-by-turn directions on the first mobile device.

6. The method of claim 1, wherein directions includes a route.

7. The method of claim 1, further comprising:
receiving, at the first mobile device, a real-time update associated with the final destination for travel of the second mobile device;
determining, at the first mobile device, whether the final destination for travel of the second mobile device has changed based on the received real-time update; and
calculating, at the first mobile device, directions from the current location of the first mobile device to the updated final destination for travel of the second mobile device upon determining that the final destination for travel of the second mobile device has changed.

8. The method of claim 1, further comprising:
receiving, at the first mobile device, a real-time update associated with the final destination for travel of the second mobile device when the final destination for travel of the second mobile device changes; and
calculating, at the first mobile device, directions from the current location of the first mobile device to the changed final destination for travel of the second mobile device.

9. The method of claim 8, wherein calculating directions from the current location of the first mobile device to the changed final destination for travel of the second mobile device includes calculating a revised route from the current location of the first mobile device to the changed location of the second mobile device.

10. A method for enabling a user of a first mobile device to navigate to a location of a user of a second mobile device, the method comprising steps of:
identifying, at a first mobile device, a user and a second mobile device associated with the user;
selecting, at the first mobile device, to navigate to the location of the second mobile device;
sending, in response to the selecting step, a navigate request over a mobile network to the second mobile device, requesting to navigate to the location of the second mobile device;
receiving via the mobile network, in response to the navigate request, a response from the second mobile device, accepting the navigate request and providing information identifying a current location of the second mobile device;
identifying the current location of the first mobile device;
calculating directions from the current location of the first mobile device to the current location of the second mobile device; and
displaying the directions on the first mobile device.

11. The method of claim 10, wherein identifying the user includes identifying a user from a contact list of the user of the first mobile device.

12. The method of claim 11, wherein identifying the second mobile device includes identifying the second mobile device from among a plurality of mobile devices associated with the identified user.

13. The method of claim 11, wherein:
sending the navigate request to the second mobile device includes sending a "tag-along" invitation data call session over the mobile network to the second mobile device; and
receiving the response from the second mobile device includes receiving an acknowledgment from the second mobile device accepting the "tag-along" invitation and providing information identifying current location of the second mobile device.

14. The method of claim 13, further comprising:
locking, at the first mobile device, onto current location of second mobile device; and
monitoring, at the first mobile device, the current location of the second mobile device.

15. The method of claim 14, wherein
calculating directions includes calculating, on the first mobile device, directions to the current location of the second mobile device; and
displaying the directions includes displaying, on the first mobile device, the directions to the current location of the second mobile device.

16. The method of claim 10, wherein displaying the directions on the first mobile device includes displaying turn-by-turn directions on the first mobile device.

17. The method of claim 10, wherein directions includes a route.

18. The method of claim 10, further comprising:
receiving, at the first mobile device, a real-time update associated with the location of the second mobile device;

determining, at the first mobile device, whether the location of the second mobile device has changed based on the received real-time update; and calculating, at the first mobile device, directions from the current location of the first mobile device to the updated location of the second mobile device upon determining that the location of the second mobile device has changed.

19. The method of claim 10, further comprising:

receiving, at the first mobile device, a real-time update associated with the location of the second mobile device when the location of the second mobile device changes; and calculating, at the first mobile device, directions from the current location of the first mobile device to the changed location of the second mobile device.

20. The method of claim 19, wherein calculating directions from the current location of the first mobile device to the changed location of the second mobile device includes calculating a revised route from the current location of the first mobile device to the changed location of the second mobile device.

21. A method for enabling a user of a first mobile device to navigate to a dynamic location associated with a second mobile device, the method comprising steps of:

identifying, at a first mobile device, a user and a second mobile device associated with the user;

selecting, at the first mobile device, to navigate in real-time to a dynamic location associated with the second mobile device;

sending, in response to the selecting step, a navigate request over a mobile network to the second mobile device, requesting to navigate in real-time to the dynamic location associated with the second mobile device;

receiving via the mobile network, in response to the navigate request, a response from the second mobile device, accepting the navigate request and providing information identifying the dynamic location associated with the second mobile device;

identifying the current location of the first mobile device;

calculating directions from the current location of the first mobile device to the dynamic location associated with the second mobile device;

updating calculated directions as the dynamic location associated with the second mobile device changes; and displaying the directions on the first mobile device.

22. The method of claim 21, wherein identifying the user includes identifying a user from a contact list of the user of the first mobile device.

23. The method of claim 21, wherein:

sending the navigate request to the second mobile device includes sending a "tag-along" navigate request to the second mobile device, requesting to navigate in real-time to the current location of the second mobile device; and receiving the response from the second mobile device includes receiving an acknowledgment from the second mobile device accepting the "tag-along" navigate request and providing information identifying the current location of the second mobile device.

24. The method of claim 21, wherein:

sending the navigate request to the second mobile device includes sending a "tag-along" navigate request to the second mobile device, requesting to navigate in real-time to a final destination for travel of the second mobile device; and receiving the response from the second mobile device includes receiving an acknowledgment from the second mobile device accepting the "tag-along" navigate request and providing information identifying the final destination for travel of the second mobile device.

25. The method of claim 21, wherein updating the calculated directions includes:

identifying that the dynamic location associated with the second mobile device has changed; and updating the calculated directions based on the changed dynamic location associated with the second mobile device.

26. The method of claim 21, wherein displaying the directions on the first mobile device includes displaying turn-by-turn directions on the first mobile device.

27. A method for enabling a first mobile device to request that a second mobile device to navigate to a location associated with the first mobile device, the method comprising steps of:

receiving, at a second mobile device and over a mobile network, a navigate request from a first mobile device, requesting that the second mobile device navigate to a dynamic location associated with the first mobile device, wherein the request includes information identifying the dynamic location associated with the first mobile device to the second mobile device;

sending to the first mobile device a response accepting the navigate request;

identifying a current location of the second mobile device;

calculating directions from the current location of the second mobile device to the dynamic location associated with the first mobile device; and displaying the directions on the first mobile device.

28. The method of claim 27, wherein the dynamic location of the first mobile device includes a current location of the first mobile device.

29. The method of claim 27, wherein the dynamic location of the first mobile device includes a final destination for travel of the first mobile device.

30. The method of claim 27, wherein displaying directions includes displaying turn-by-turn directions.

31. The method of claim 27 further comprising updating the calculated directions as the dynamic location of the first mobile device changes.

* * * * *